Patented Feb. 8, 1944

2,341,381

UNITED STATES PATENT OFFICE 2,341,381

TREATMENT OF GELATIN

Edwin E. Jelley and Walter J. Weyerts, Rochester, N. Y., assignors to Eastman Kodak Company, Rochester, N. Y., a corporation of New Jersey No Drawing. Application September 11, 1940, Serial No. 356,354. In Great Britain January 5, 1940

3 Claims. (Cl. 260—118)

This invention relates to treatment of gelatin. It is known that gelatin finds many uses in technology and especially in the preparation of photographic products. Gelatin, being a natural product, is liable to considerable variation in some of its constituents, from batch to batch, even though the batches are of the same type of gelatin. These variations can, and frequently do, cause considerable variation in the behavior of the gelatin in practice.

In the preparation of gelatin to be used for photographic products, it is necessary to give the gelatin a special treatment or purification in order to remove substantially all of certain of the mineral matter occurring naturally in the gelatin. Particularly where the gelatin is to be used as a medium in which acid dyes, especially sulfonated dyes, are dispersed, it is essential to substantially remove mineral matter, such as calcium, from the gelatin, in order to avoid crystallization or precipitation of the dyes in the gelatin. In removing mineral matter, such as calcium, from gelatin intended for use in the preparation of photographic products, it is essential to avoid substantially, any appreciable disturbance of the properties of the gelatin which make it a useful substance in the preparation of photographic products, such as photographic emulsions. Thus, it is essential to avoid substantially changing the pH of the gelatin and to avoid substantial removal of certain constituents which affect the sensitivity of the light-sensitive materials which may be introduced into the emulsion.

It is known that calcium can be substantially removed from gelatin by washing the gelatin with aqueous solutions of common salt (about 10% by weight, in strength) which solutions contain hydrochloric acid. This method has the great disadvantage of changing the pH of the gelatin considerably. Because of this change, it is proposed in this known process, to follow the washing with the acidulated salt solution, with a washing with a neutral 1% salt solution, in an attempt to readjust the pH of the gelatin. The calcium, however, is removed during the washing with the acidulated salt solution.

We have now found that calcium can be substantially removed from gelatin by treating the gelatin with a neutral solution of an alkali metal or ammonium salt. By avoiding the acid employed in the prior art processes, we avoid any appreciable change in the pH of the gelatin. Moreover, our new process has the further advantage of not causing a great deal of swelling of the gelatin, when we employ neutral solutions of alkali metal or ammonium sulfates. It is altogether surprising that sulfates of alkali metals or ammonium readily remove calcium from gelatin, since calcium sulfate has a very low solubility in water.

Our new process is not to be confused with processes where gelatin is decalcified by treatment with alkali metal or ammonium metaphosphates. In the metaphosphate processes, the calcium is removed from the gelatin by virtue of the formation of alkali metal (or ammonium) calcium metaphosphate complexes, whereas in our new process there is an actual interchange of cations, the alkali metal or ammonium cation from the neutral solution actually replacing the calcium in the gelatin, thereby producing an alkali metal or ammonium gelatin complex.

It is, accordingly, an object of our invention to provide an improved process for purifying gelatin. Other objects will become apparent hereinafter.

In accordance with our invention, we treat gelatin with a neutral solution of an alkali metal (sodium, potassium, lithium, etc.) or ammonium salt. Chlorides, nitrates, perchlorates and sulfates can be used, although nitrates produce considerable swelling of the gelatin. The sulfates have the great advantage of suppressing the swelling of the gelatin. Moreover, neutral sulfates have no appreciable action on a photographic gelatino-silver-halide emulsion, so that a shredded emulsion can be decalcified by treatment with a solution of sodium sulfate as an integral step in the emulsion making technique, i. e., at the convention emulsion washing step.

The following example will serve to illustrate the manner of practicing our invention. This example is not intended to limit our invention.

*Example*

Dried leaf gelatin containing 0.4% calcium was immersed for 30 minutes in a 10% solution of sodium sulfate ($Na_2SO_4$). It was then washed in a few changes of distilled water (hard waters containing calcium should not be used for washing, as the calcium in the water will replace the sodium in the sodium gelatin complex, to reproduce a calcified gelatin). At the end of this treatment, the gelatin contained 0.03% of calcium. Further treatments with a 10% solution of sodium sulfate further diminished the amount of calcium to 0.01%. The very small percentage of residual calcium, which can only be removed after acidification of the gelatin, is probably present as calcium phosphate.

The present method of decalcifying gelatin is of particular value, when for any reason, it is desired to remove the calcium from a manufactured gelatin, especially as it is not necessary to dissolve the gelatin, as it is in the zeolite process, described in the copending application of Edwin E. Jelley, Serial No. 296,320, filed September 23, 1939, now Patent No. 2,273,577.

Gelatin prepared in accordance with our invention is of particularly value in the preparation of photographic gelatino-silver-halide emulsions, and in the preparation of light filters, where acid dyes, e. g., chrysophenine, are introduced into the gelatin according to the various needs of photography.

What we claim as our invention and desire to be secured by Letters Patent of the United States is:

1. A process for decalcifying gelatin comprising replacing the calcium in a calcium-containing-gelatin with a cation selected from the group consisting of alkali metal and ammonium cations, by treating without dissolving the calcium-containing-gelatin with a neutral aqueous solution of a salt selected from the group consisting of alkali metal and ammonium normal sulfates, removing the gelatin from the aqueous solution, and then washing the gelatin in water containing no more calcium than the gelatin.

2. A process for decalcifying gelatin comprising replacing the calcium in a calcium-containing-gelatin with an alkali metal ion, by treating without dissolving the calcium-containing-gelatin with a neutral solution of an alkali metal sulfate, removing the gelatin from the aqueous solution, and then washing the gelatin in water containing no more calcium than the gelatin.

3. A process for decalcifying gelatin comprising replacing the calcium in a calcium-containing-gelatin with a sodium ion, by treating without dissolving the calcium-containing-gelatin with a neutral solution of sodium sulfate, removing the gelatin from the aqueous solution, and then washing the gelatin in water containing no more calcium than the gelatin.

EDWIN E. JELLEY.
WALTER J. WEYERTS.